United States Patent [19]

Petersen

[11] Patent Number: 4,553,253
[45] Date of Patent: Nov. 12, 1985

[54] PLANE-GRATING MONOCHROMATOR

[75] Inventor: Helmuth Petersen, Berlin, Fed. Rep. of Germany

[73] Assignee: Berliner Elektronenspeicherring Gesellschaft, Berlin, Fed. Rep. of Germany

[21] Appl. No.: 704,131

[22] Filed: Jun. 20, 1984

Related U.S. Application Data

[63] Continuation of Ser. No. 327,657, Dec. 4, 1981.

[30] Foreign Application Priority Data

Dec. 5, 1980 [DE] Fed. Rep. of Germany ....... 3045931

[51] Int. Cl.$^4$ .................. G01J 3/18; G02B 27/44; G21K 1/06
[52] U.S. Cl. ...................................... 378/084; 356/334
[58] Field of Search ............................ 378/84; 356/334

[56] References Cited

U.S. PATENT DOCUMENTS 4,254,335  3/1981  Tundello et al. .................... 378/84

OTHER PUBLICATIONS

Fastie, W. G., "A Small Plane Grating Monochromator," JOSA, vol. 42, No. 9, 641–647, Sep. 1952.
Eastman, D. E. et al., "Easily Tunable Monochromator for 5 eV≲Wavelength≲1000 eV Synchrotron Radiation," *IBM Technical Disclosure Bulletin*, vol. 19, No. 11, (Apr. 1977).

Primary Examiner—Alfred E. Smith
Assistant Examiner—T. N. Grigsby
Attorney, Agent, or Firm—Edwin E. Greigg

[57] ABSTRACT

A plane-grating monochromator is described which is particularly well suited for wavelengths in the range from approximately 1 to 15 nanometers and contains as its primary optical elements a diffraction grating (16) and an ellipsoid mirror (20). If both the entry aperture and the exit aperture are intended to be stationary, then a pivotable mirror (14) preceding them is provided. The present plane-grating monochromator is distinguished by an accurate image, virtually free of distortion, and correspondingly high resolution as well as by simple optics; it includes only two or three optical elements, and a kinematically simple adjusting mechanism for the optical elements suffices for adjusting the wavelength.

9 Claims, 8 Drawing Figures

PLANE-GRATING MONOCHROMATOR

This is a continuation of copending application Ser. No. 327,657 filed Dec. 4, 1981.

The present invention relates to a plane-grating monochromator, in particular for electromagnetic radiation in remote vacuum ultraviolet (VUV) and in the field of soft X-radiation; that is, in the wavelength range from approximately 1 to 15 nanometers. However, the present plane-grating monochromator can also be used to advantage for the spectral decomposition of radiation in a different wavelength range or of some other kind of wave radiation than electromagnetic radiation, because this monochromator permits the attainment of an accurate image, practically free of image distortion, and thus high resolution as well, with simple optical means including only two or three optical elements and with a kinematically simple adjusting mechanism for these elements.

Plane-grating monochromators for short-wave optical radiation have heretofore been available in two basic optical configurations:

(a) For the visible and ultraviolet spectral range, with a spherical mirror disposed between the entry slit or the exit slit, respectively, and the grating in order to parallelize and focus the radiation: the Czerny-Turner monochromator (Z. Phys., vol. 61, [1930], p. 792); and (b) for the vacuum ultraviolet spectral range with a very remote source (on the order of magnitude of 40 m) and with a paraboloid mirror between the grating and the exit slit for focusing the radiation (JOSA, vol. 58 [1968], p. 1415). In plane-grating monochromators of this type, it is also known to use a preceding mirror between the source for the radiation to be decomposed and the flat diffraction grating; this mirror is adjusted together with the diffraction grating by an adjusting device such that, with a constant direction of entry of the radiation to be decomposed and a constant exit direction of the decomposed radiation from the grating to the exit slit, the grating is always operated at the blaze maximum for the wavelength of the decomposed radiation focused onto the exit slit. (Rev. Sci. Instr., vol. 43, No. 3, [1972], pp. 434–442.)

A disadvantage in the known plane-grating monochromators which operate with a paraboloid mirror as the focusing element is that two major image defects occur, which critically limit both the possible acceptance and the attainable resolution. First, the focus in appliances built heretofore shifts in accordance with wavelength in the meridional plane (dispersion plane). Since the position of the exit slit is fixed, this effect restricts both resolution and acceptance, because the focal width of the paraboloid mirror must always be small in comparison with the distance of the virtual radiation source where the decomposed radiation focused by the paraboloid mirror onto the exit slit appears to originate. Second, a further error which reduces the resolution occurs, because the distance from the source is never equal to the correct distance for a paraboloid mirror, which is "infinity".

The present invention avoids these image defects in a plane-grating monochromator in that the quotient of the sine of the angle of emergence divided by the sine of the angle of incidence onto the diffraction grating, and thus the distance of a virtual source of the decomposed radiation from the diffraction grating, are kept constant by the adjusting device, and that the hollow mirror is an ellipsoid mirror which reproduces the image of the virtual source in the exit aperture.

The plane-grating monochromator according to the invention has the advantage over the prior art that a virtual radiation source is generated which is at a constant, finite distance from a stationary axis of rotation of the plane diffraction grating, and an image of this source is continuously projected accurately onto the exit slit by the ellipsoid mirror in a dispersion plane, over the entire spectral range to be encompassed. The present monochromator, having the new "plane-grating and ellipsoid-mirror" optics thus enables a substantial increase in the capacity of plane-grating monochromators, especially in the remote vacuum ultraviolet and soft X-radiation ranges. The resolution attainable can be increased in comparison with the known type discussed above under (b), and in contrast to the known type (a), shorter distances of the source and therefore greater acceptances and photon flows are realizable without additional optical elements. With a movable source (entry slit) or a movable exit slit, only two optical elements are required in the monochromator according to the invention, and the sole additional requirement is a preceding mirror, which can be rotated about a fixed axis if both the source and the exit slit are intended to be stationary.

Exemplary embodiments of the invention will be explained in greater detail below, referring to the drawing.

Shown are.

Figure 1:
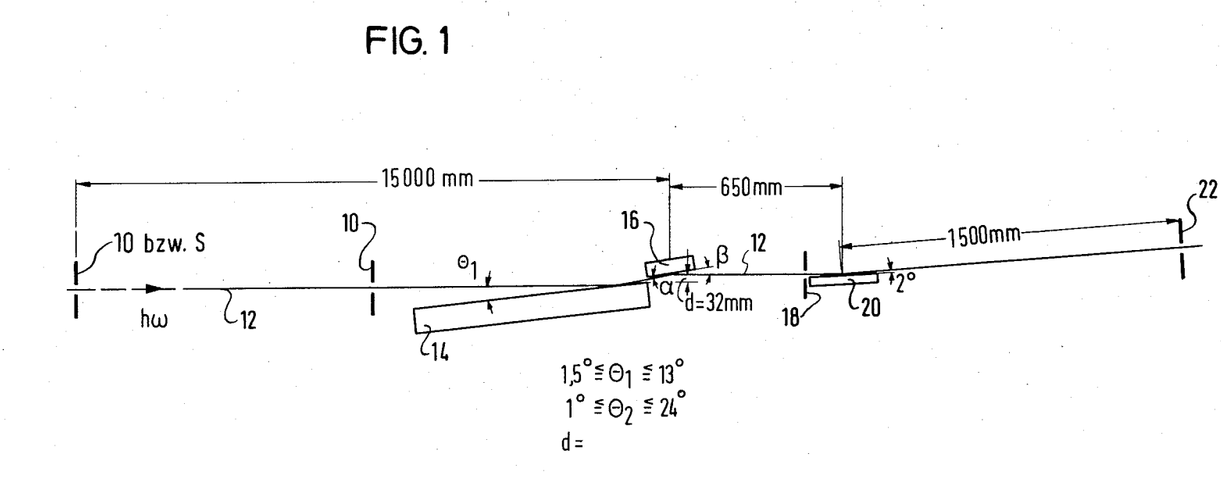
FIG. 1, a schematic illustration of the essential optical elements of a plane-grating monochromator, which is designed for the remote vacuum ultraviolet and soft X-radiation ranges.

The plane-grating monochromator shown in FIG. 1 contains an entry aperture 10, which defines the source of a bunch 12 of electromagnetic radiation which is to be spectrally decomposed. Following the entry aperture 10 in the path of the bunch 12 are a preceding mirror 14 and next a diffraction grating 16, for instance a ruled grating having 1200 lines per mm. A bunch 12' of the first order of the radiation decomposed by the grating passes through an intermediate aperture 18 which blocks the zero order and onto an ellipsoid mirror 20, which focuses this radiation beam onto an exit slit 22.

In the present plane-grating monochromator, the preceding mirror and the grating are adjusted by an adjusting device, which is not the subject of the present application and may be embodied as described in claim 1 of German patent application No. 31 02 684, in such a way that the virtual radiation source S' (FIGS. 2 and 3) at which the decomposed radiation bunch originates (that is, the bunch of the first order of the wavelength focused onto the exit slit 22) is spatially fixed; that is, it has a position not dependent on wavelength.

Since $$R' = R(\sin^2 \beta / \sin^2 \alpha)$$

this is attained by the selection of a constant ratio $$\sin \beta / \sin \alpha = \text{const} = c_1 \qquad (1)$$

This means that the distance R' of the virtual radiation source S' from the plane diffraction grating 16 has a constant value, which is not dependent on the wavelength.

Figure 7:
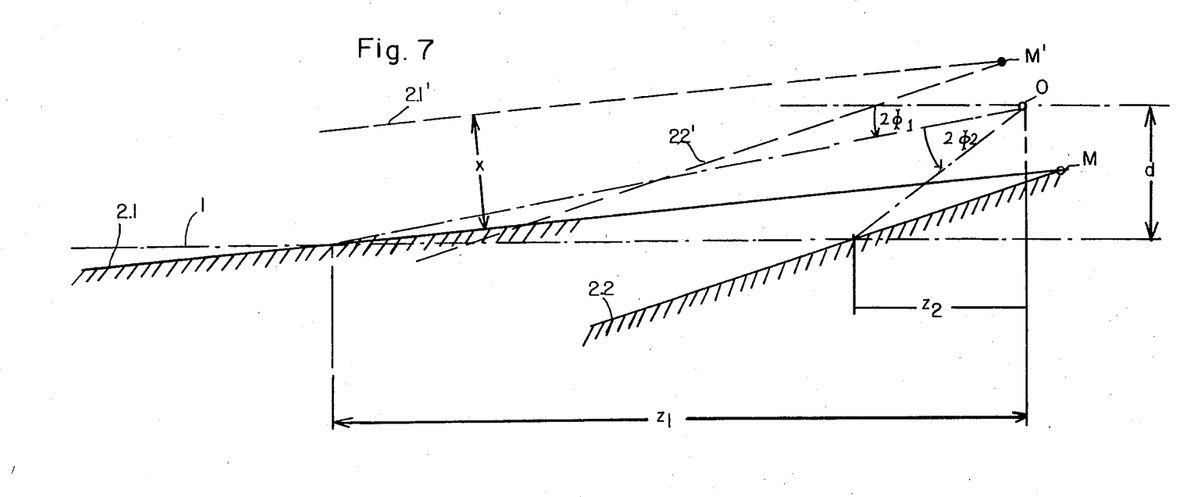
FIG. 7 is a schematic drawing of a prior art device.

The adjusting mechanism is advantageously embodied such that it rotates the diffraction grating 16 about an axis extending vertically with respect to the path of the radiation bunch 12 and located in the center of the plane of the grating (perpendicular to the plane of the drawing in FIG. 1) and pivots the mirror 14 about a second axis, which extends parallel to the grating axis, in such a manner that the entry and exit directions of the radiation both remain fixed, and the condition of equation (1) above is satisfied. The mirror 14 is long enough in the direction of the incident radiation that the required range for the angle of reflection can be encompassed by pivoting the mirror about a stationary axis, without also requiring the translation of the mirror. For example, in FIGS. 7 and 8, it will be seen that obviously two positions 2.1 and 2.2 of a plane mirror rotatable about M exist in which radiation 1 is reflected to the same point O. The lines 2.1' and 2.2' which are equidistant or parallel to the original mirror plane position 2.1 and 2.2 and have a predetermined normal distance x therefrom define another tilting axis M' so that three positions exist in which the plane mirror reflects the beam 1 to point O. The angular region between those three mirror positions provides for reflecting the beam 1 on point O with an accuracy which is within the diffraction limit of the radiation.

Figure 8:
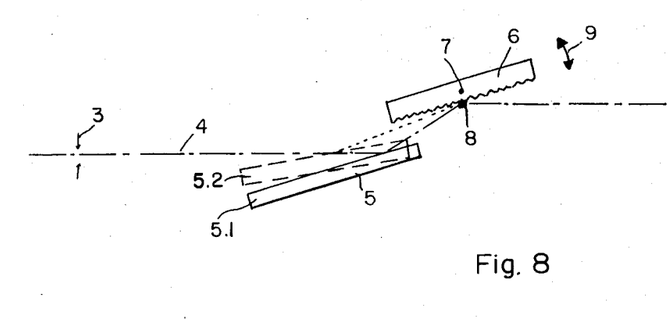
FIG. 8 is a schematic drawing of an embodiment of the prior art device shown in FIG. 7.

By FIG. 8 it will be seen that the radiation 4 entering through the entrance slot 3 impinges on a plane mirror 5 and is reflected by it onto a diffraction grating 6. The mirror 5 is tiltable about an axis 7 which is positioned above its reflecting surface within the grating 6. The grating 6 is tiltable, as indicated by a double arrow 9, around an axis 8 going through its optical active surface.

The mirror 5 is shown in two positions 5.1 and 5.2. In both rotary positions, the radiation 4 impinges on a beam impingement spot on grating 6 defined by axis a.

The further elements (18, 20, 22) of the monochromator, shown in FIG. 1, are provided after the grating 6. U.S. application Ser. No. 326,679 filed Dec. 2, 1981, and now U.S. Pat. No. 4,490,041.

Figure 4:
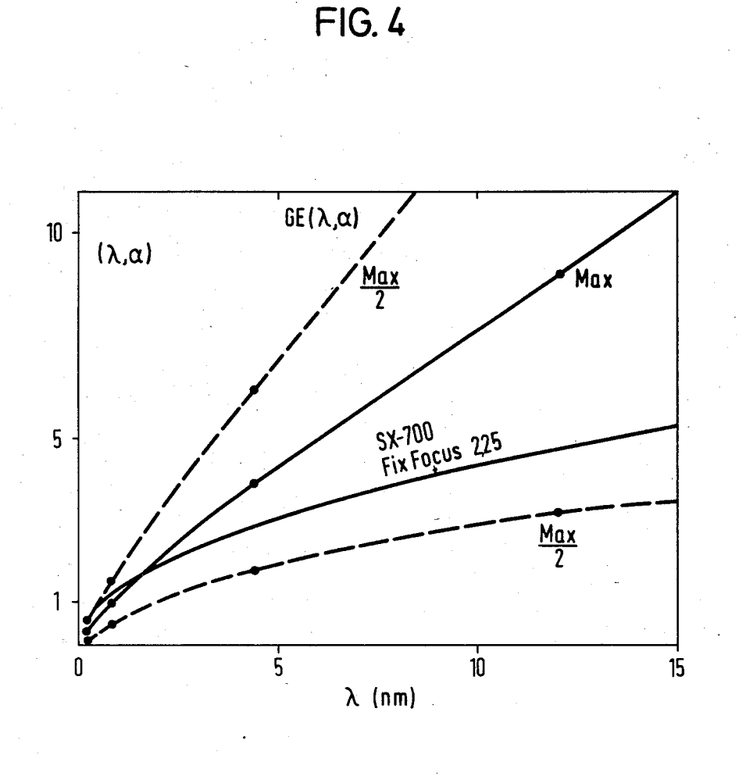
FIG. 4, a graphic illustration of the grating efficiency GE as a function of the wavelength $\lambda$ and of the angle of incidence $\alpha$ at the grating. Shown are the curve for maximum efficiency and 50% of the maximal efficiency at smaller and larger angles $\alpha$ in accordance with empirically obtained data (Rev. Sci. Instr., vol. 51 [1980], p. 814; Nucl. Instr. Meth., vol. 152 [1978], p. 117;. Nucl. Instr. Meth., vol. 152 [1978], p. 127). The course of the $(\lambda,\alpha)$ curve for the plane-grating monochromator of FIGS. 1 and 2 having a grating with a ruled density of 1200 lines per mm and c=2.25 is identified as "SX-700 fixed focus 2.25"

It can be demonstrated that this mode of operation, in which, as noted above, the ratio of the sine of the angle of emergence $\beta$ to the sine of the angle of incidence $\alpha$ is kept constant for optical reasons, also has value in terms of the grating efficiency. For instance, if the grating efficiency GE $(\lambda,\alpha)$ is optimized in a grating of 1200 l/mm for the short-wave portion of the spectral range from approximately 1 to 44 nanometers encompassed by the present exemplary embodiment, then the value of 2.25 is obtained for the constant c, and the efficiency then attainable over this entire wavelength range is always greater than half the theoretically maximum grating efficiency (see FIG. 4).

For the wavelength $\lambda$ and the total deflection angle $2\theta$ at the diffraction grating 16, the following equations pertain:

$$\pi = d(\cos \alpha - \cos [\arcsin (c \cdot \sin \alpha)]) \qquad (2)$$

$$2\theta = 180° - (\alpha + \arcsin (c \cdot \sin \alpha)) \qquad (3)$$

In order to vary the total deflection angle 10 (with a fixed exit direction of the radiation bunch 12') in accordance with the wavelength, the direction of the radiation bunch striking the grating is, as noted, varied continuously.

Figure 2:
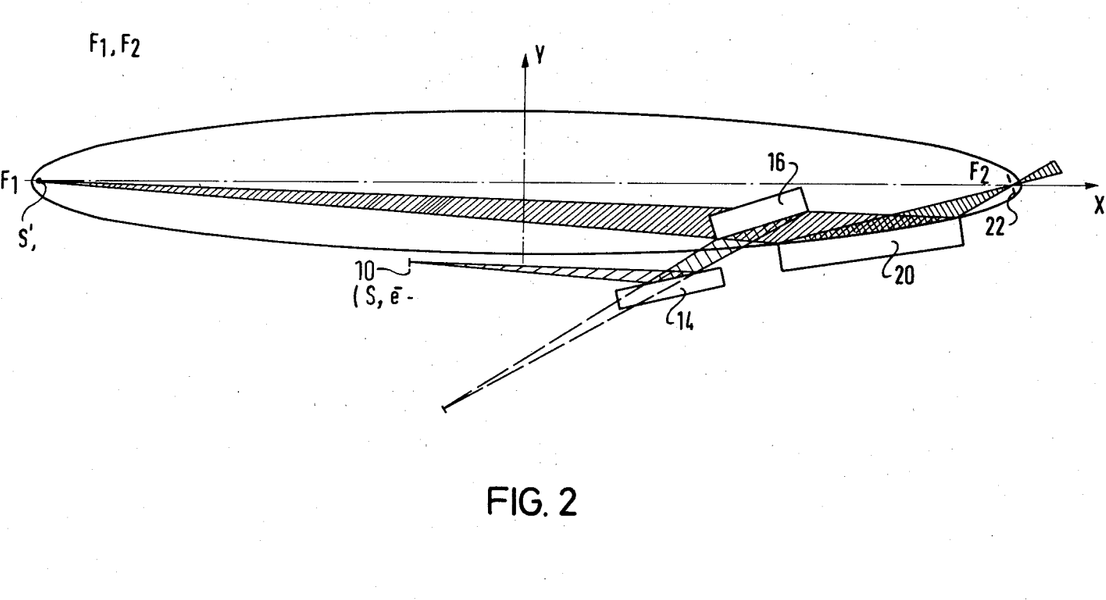
FIG. 2, an illustration of the path of the beam in the monochromator of FIG. 1.
Figure 3:
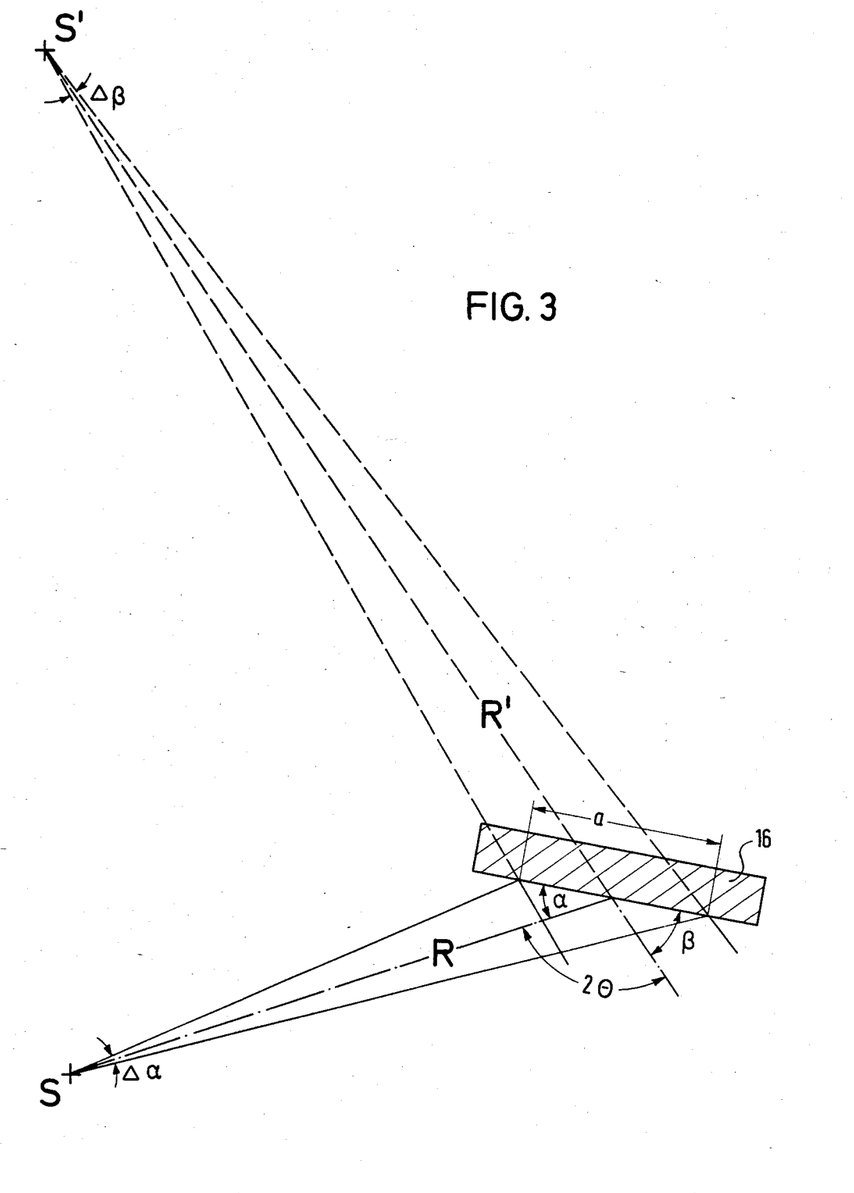
FIG. 3, an illustration of the real and virtual beam path in the vicinity of the diffraction grating.

The virtual radiation source S' is located in one focus F1 and the exit slit 22 is located in the other focus F2 of the ellipsoid, of which the ellipsoid mirror 20 forms one part (FIG. 2). The image produced by the ellipsoid mirror 20 is therefore distortion-free in the dispersion plane for a virtually punctiform radiation source over the entire spectral range encompassed by the monochromator. The resolution which can be attained is limited solely by the angular interval between the real radiation source S some arbitrary point on the grating surface; that is, the resolution attainable is limited by the dimensions of the radiation source and by the distance of the grating from the radiation source.

The image distortions associated with the use of the flat grating in non-parallel light (*J. Opt. Soc. Am.*, vol. 52 [1968], p. 768) and of the ellipsoid mirror with a non-punctiform source (*J. Opt. Soc. Am.*, vol. 66 [1976], p. 938) are of secondary importance, given the dimensions of sources of soft X-radiation (electron bunches in electron storage rings) and the provided aperture ratio of the optical elements, while the astigmatism caused by the different distances from the source in the sagittal and meridional planes does not cause a reduction in resolution.

One practical example of the monochromator schematically illustrated in FIG. 1 had the following specifications:

Density of grating rules: 1200 lines/mm
Grating width (transverse with respect to dispersion plane): 30 mm
Focal distance between ellipsoid mirror and exit slit: 1500 mm {1000 mm}
Grazing incidence at ellipsoid mirror: 2°
Distance from grating axis to real source S (in radiation direction): 15,000 mm
Distance from grating axis to center of ellipsoid mirror: 650 mm {500 mm}

$$\sin \beta / \sin \alpha = \text{const} = 2.25$$

Therefore:
Focal distance from ellipsoid mirror to virtual source S': 7,6587.5 mm
Normal shape of the ellipse:

$x^2/(39043.75 \text{ mm})^2 + y^2/(374.062 \text{ mm})^2$
$\{x^2/(38718.75 \text{ mm})^2 + y^2/(305.1212 \text{ mm})^2 = 1\}$ The data enclosed in braces apply to a modified form of embodiment.

The range of variation of the grazing incidence at the mirror 14 is $1.5° \leq \theta_1 \leq 13°$, with a horizontal direction of the beam leaving the grating, therefore:

The range of variation of the total deflection angle via the grating is $154° \leq 2\theta \leq 177°$ The spectral range encompassed with these data is $\sim 0.8 \text{ nm} \leq \lambda \leq 33.8 \text{ nm}$ in the described optical mode with a fixed virtual source.

In an inversion of equation (2), the dependency of the angle of incidence $\alpha$ on the wavelength $\lambda$ of the monochromatic radiation focused on the exit slit 22 is explicitly discussed in an appendix to this specification.

A preferred exemplary embodiment of the invention has been described with the aid of FIGS. 1-4; in that example, both the entry slit (that is, the effective radiation source) and the exit slit are stationary and a grazing angle of radiation incidence onto the diffraction grating is used (that is, angles of incidence smaller than approximately 15°). If it is presumed that either the entry slit or the exit slit must be adjusted in selecting the wavelength, then forms of embodiment such as those shown in FIGS. 5 and 6, analagous to FIG. 2, are the result. These forms of embodiment do not require the preceding mirror, so that only two optical elements are required, the flat diffraction grating 16 and the ellipsoid mirror 20.

Figure 5:
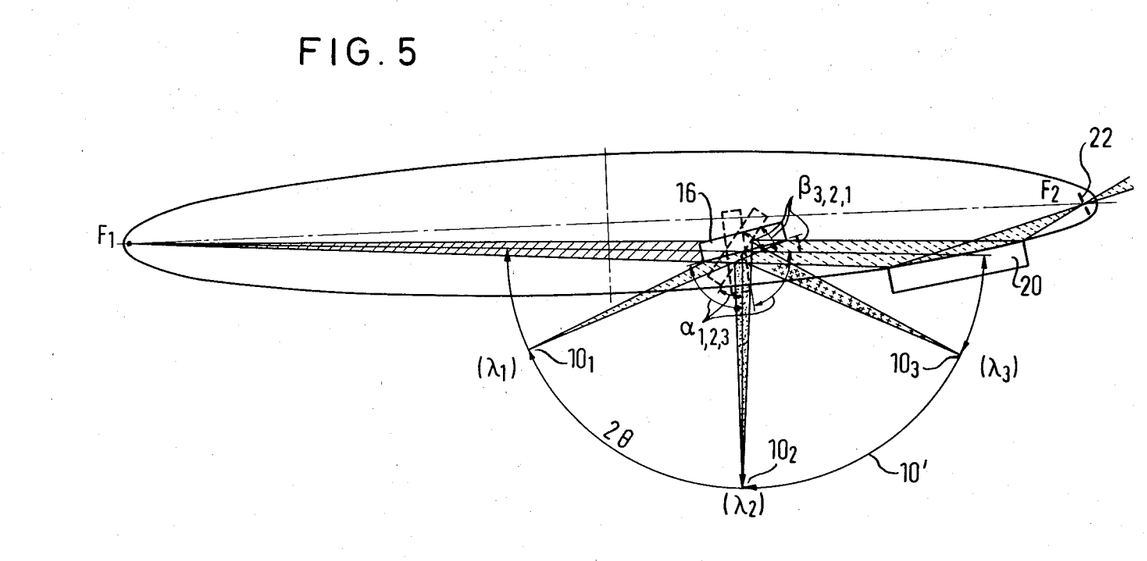
FIG. 5, a form of embodiment of the present plane-grating monochromator having a movable entry slit and a stationary exit slit.

In the plane-grating monochromator according to FIG. 5, the exit slit 22 is stationary, while in selecting the wavelength the entry slit or the real radiation source is pivoted about the axis of rotation of the grating by the adjusting device in accordance with the rotation of the grating 16 along a semicircular path 10' in such a manner that the condition of equation (1) is still satisfied. The angle of incidence can be varied, from very low values (representing grazing incidence) up to the vicinity of 90°. In FIG. 5, the positions of the grating 15, the angles of incidence and emergence $\alpha_1$–$\alpha_3$ and $\beta_1$–$\beta_3$ as well as the locations $10_1$–10 Z3 of the entry slit are shown for three different selected wavelengths $\lambda_1$–$\lambda_3$.

Figure 6:
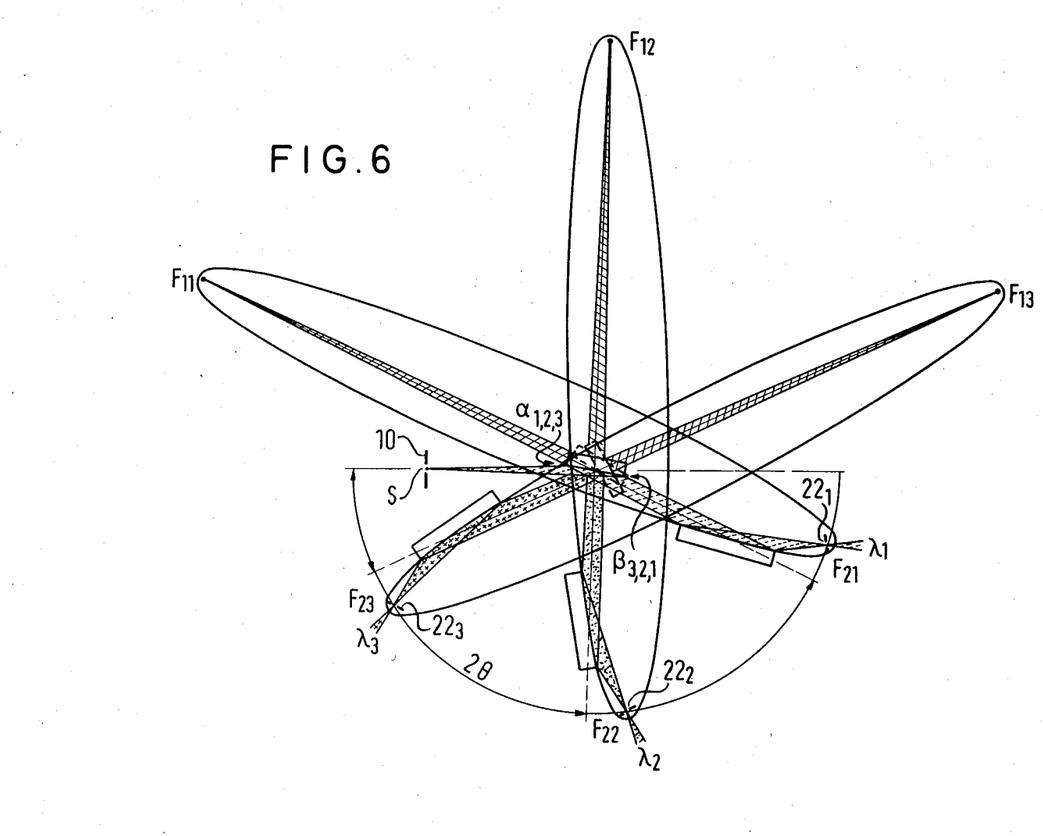
FIG. 6, a form of embodiment of the present plane-grating monochromator having a stationary entry slit and a movable exit slit.

FIG. 6 in corresponding fashion shows the bunch paths in a plane-grating monochromator in which the source for the polychromatic radiation, or the entry slit, is stationary and the exit slit is pivoted during wavelength selection along a arced path 22' about the axis of rotation of the diffraction grating. Again, the three positions of the diffraction grating 16, the angles of incidence and emergence $\alpha_1$–$\alpha_3$ and $\beta_1$–$\beta_3$, locations $22_1$–$22_3$ of the exit slit, and locations $F_{12}$–$F_{13}$ of the virtual radiation source (corresponding to one of the foci of the ellipse) are shown for three selected wavelengths $\lambda_1$–$\lambda_3$.

The terms "entry slit" and "exit slit" are to be understood in the sense of an entry aperture and exit aperture, because a diaphragm or shutter element at the slit may be omitted if the radiation source or radiation detector for the selected, monochromatic radiation is substantially linear or punctiform.

APPENDIX

Dependency of the Angle of Incidence $\alpha$ on the Wavelength $\lambda$ of the Decomposed Radiation The following discussion is intended to illustrate the (grazing) incidence $\alpha$ at the grating in accordance with the wavelength $\lambda$. Since in practice, the wavelengths (photon energy) are always preselected, this form of illustration is important.

The angular range encompassed, with $c = 2.25$ is:

$0.9° \leq \alpha \leq 8°$ corresponding to $0.016 \text{ rad} \leq \alpha \leq 0.14 \text{ rad}$ A logical approximation is thus obtained, terminating the development of an exponential series for the trigonometric functions after the 6th power in $\alpha$ or $f(\alpha)$:

$$\sin(\alpha) \cong \alpha - \frac{\alpha^3}{3!} + \frac{\alpha^5}{5!} \; ; \; w \stackrel{\text{Def.}}{=} c\left(\alpha - \frac{\alpha^3}{3!} + \frac{\alpha^5}{5!}\right) \quad (A1)$$

$$\arcsin(w) \cong w + 1/6 w^3 + 3/40 w^5 \quad (A2)$$

$$\cos(u) \cong 1 - u^2/2? + u^4/4? - u^6/6? \quad (A3)$$

In this approximation, $$\cos(\arcsin(w)) \cong 1 - w^2/2 - w^4/8 - w^6/16 \quad (A4)$$

and as a function of $\alpha$:

$$\cos(\arcsin(c \cdot \sin\alpha)) \cong 1 - \alpha^2 \frac{c^2}{2} - \alpha^4\left(\frac{c^4}{8} - \frac{c^2}{6}\right) - \alpha^6\left(\frac{c^2}{45} - \frac{c^4}{12} + \frac{c^6}{16}\right) \quad (A5)$$

The result is thus a cubic equation in $\alpha^2$. Using the approximation $$\cos\alpha \cong 1 - \alpha^2/2? + \alpha^4/4? - \alpha^6/6? \quad (A6)$$

and substituting $$\alpha^2 \rightarrow z$$

the desired exponential series approximation for is $$\lambda \cong d[z(c^2/2 - \tfrac{1}{2}) + z^2(c^4/8 - c^2/6 + 1/24) + z^3(c^6/16 - c^4/12 + c^2/45 - 1/720)] \quad (A7)$$

By conversion, $$z = f(\lambda) \text{ and thus } \alpha = f(\lambda);$$

the equation A7 takes the form $$Az^3 + Bz^2 + Cz + D = 0 \quad (A8)$$

with $A = c^6/16 - c^4/12 + c^2/45 - 1/720$ $B = c^4/8 - c^2/6 + 1/24$ $C = c^2/2 - \frac{1}{2}$ $D = \lambda/d$ With the aid of Cardan's formula*, equations of the form $$x^3 + px + q = 0 \tag{A9}$$

can be solved by factoring. By substituting $z = x - 3B/A$ equation A8 is put into the following form:

$$(A8) \Longleftrightarrow x^3 + x\underbrace{\left(\frac{C}{A} - \frac{B^2}{3A^2}\right)}_{p} + \underbrace{\left(\frac{2B^3}{27A^3} - \frac{CB}{3A^2} - \frac{\lambda}{Ad}\right)}_{q} = 0 \tag{A10}$$

Equation A9, A10 has the solution $$x = \sqrt[3]{-\frac{q}{2} + \sqrt{\left(\frac{q}{2}\right)^2 + \left(\frac{p}{3}\right)^3}} + \sqrt[3]{-\frac{q}{2} - \sqrt{\left(\frac{q}{2}\right)^2 + \left(\frac{p}{3}\right)^3}} \tag{A11}$$

and thus $$\alpha = \sqrt{z} = \sqrt{x - \frac{B}{3A}} \text{ (rad)} = f(\lambda) \tag{A12}$$

is therefore explicitly proved to be a function of $\lambda$.

*Note on the use of Cardan's formula (A11): For one of the roots, the real value is selected. The value to be selected for the outer cube root depends on the condition that the product of both roots must be $-p/3$.

I claim:

1. A plane-grating monochromator, having a flat diffraction grating, an entry aperture through which a bunch of wave radiation to be spectrally decomposed passes and strikes the diffraction grating, an exit aperture, a hollow mirror for focusing the radiation decomposed by the diffraction grating into the exit aperture and an adjusting device, which effects a predetermined adjustment of the angle of incidence and emergence of the radiation with respect to the plane of the diffraction grating in accordance with the wavelength of the decomposed, substantially monochromatic radiation focused by the hollow mirror into the exit aperture, characterized in that the adjusting device keeps the quotient of the sine of the angle of emergence ($\beta$) divided by the sine of the angle of incidence ($\alpha$) onto the diffraction grating, and thus the distance of a virtual source (S') of the decomposed radiation from the diffraction grating (16), constant and that the hollow mirror (20) is an ellipsoid mirror, which focuses the virtual source (S') into the exit aperture (22).

2. A plane-grating monochromator as defined by claim 1, characterized in that the diffraction grating operates with a grazing incidence on the part of the radiation to be decomposed.

3. A plane-grating monochromator as defined by claim 1 having stationary entry and exit apertures, characterized by an adjustable preceding mirror (14) disposed between the entry aperture (10) and the diffraction grating (16), this mirror permitting the radiation which is to be decomposed and which is arriving from the entry aperture (10) to strike the diffraction grating (16) in such a manner that the condition $\sin \beta / \sin \alpha = \text{const.}$ is still satisfied if the diffraction grating is rotated.

4. A plane-grating monochromator as defined by claim 3 having a grating of 1200 1/mm optimized for a radiation to be decomposed which is in the wavelength range of approximately 5 nanometers, characterized in that $\sin \beta / \sin \alpha = 2.25.$ 5. A plane-grating monochromator as defined by claim 3, characterized in that the entry and exit apertures (10, 22) are slitlike in form.

6. A plane-grating monochromator as defined by claim 1, characterized in that an intermediate diaphragm (18) blocking the zero order is disposed ahead of the ellipsoid mirror (20) in the beam path of the decomposed radiation.

7. A plane-grating monochromator as defined by claim 2, having a grating of 1200 1/mm optimized for a radiation to be decomposed which is in the wavelength range of approximately 5 nanometers, characterized in that $\sin \beta / \sin \alpha = 2.25.$ 8. A plane-grating monochromator as defined by claim 2, characterized in that the entry and exit apertures (10, 22) are slitlike in form.

9. A plane-grating monochromator as defined by claim 2 having stationary entry and exit apertures, characterized by an adjustable preceding mirror (14) disposed between the entry aperture (10) and the diffraction grating (16), this mirror permitting the radiation which is to be decomposed and which is arriving from the entry aperture (10) to strike the diffraction grating (16) in such a manner that the condition $\sin \beta / \sin \alpha = \text{const.}$ is still satisfied if the diffraction grating is rotated.

* * * * *